US008681988B2

(12) United States Patent
Kehren et al.

(10) Patent No.: US 8,681,988 B2
(45) Date of Patent: Mar. 25, 2014

(54) ENCODING A CONNECTION BETWEEN A BASE AND A MOBILE PART

(75) Inventors: Dieter Kehren, Dinslaken (DE); Gustavo Fernandez, Bocholt (DE); Stefan Hülder, Dorsten (DE)

(73) Assignee: Gigaset Communications GmbH (DE)

( * ) Notice: Subject to any disclaimer, the term of this patent is extended or adjusted under 35 U.S.C. 154(b) by 37 days.

(21) Appl. No.: 13/321,209

(22) PCT Filed: Jun. 17, 2010

(86) PCT No.: PCT/EP2010/058568
§ 371 (c)(1),
(2), (4) Date: Jan. 19, 2012

(87) PCT Pub. No.: WO2010/146128
PCT Pub. Date: Dec. 23, 2010

(65) Prior Publication Data
US 2012/0106740 A1    May 3, 2012

(30) Foreign Application Priority Data
Jun. 18, 2009  (DE) .......................... 10 2009 029 828

(51) Int. Cl.
*H04K 1/00*       (2006.01)

(52) U.S. Cl.
USPC .......................................................... 380/270

(58) Field of Classification Search
None
See application file for complete search history.

(56) References Cited

U.S. PATENT DOCUMENTS

| 8,370,647 | B2 * | 2/2013 | Kitani ........................... 713/193 |
| 2002/0066018 | A1 * | 5/2002 | Linnartz ....................... 713/171 |
| 2003/0105954 | A1 * | 6/2003 | Immonen et al. ............ 713/156 |
| 2005/0154896 | A1 * | 7/2005 | Widman et al. .............. 713/182 |
| 2006/0034461 | A1 * | 2/2006 | Park .............................. 380/277 |
| 2007/0076877 | A1 * | 4/2007 | Camp et al. ................... 380/255 |
| 2007/0101122 | A1 * | 5/2007 | Guo .............................. 713/153 |
| 2007/0234058 | A1 * | 10/2007 | White .......................... 713/176 |

(Continued)

FOREIGN PATENT DOCUMENTS

EP    1843540 A1    10/2007
EP    1855177 A1    11/2007

OTHER PUBLICATIONS

Patiyoot et al., "Cryptographic Security Techniques for Wireless Networks", Apr. 1999, ACM SIGOPS Operating Systems Review, vol. 33, Issue 2, pp. 36-50.*

(Continued)

*Primary Examiner* — Brandon Hoffman
*Assistant Examiner* — Carlos Amorin
(74) *Attorney, Agent, or Firm* — Schmeiser, Olsen & Watts, LLP

(57) ABSTRACT

A method for encoding a connection between a base (2) and a mobile part (1), and a computer program product is povided. The method comprises generating a key agreed to by the base (2) and the mobile part (1) during a first connection, wherein the key comprises an index assigned by the base during the first connection, and b) using the generated key for a second connection between the base (2) and the mobile part (1), wherein the data to be transferred between the base (2) and the mobile part (1) are identified and encoded using the index assigned to the key. The security of wireless data transfer is thus increased in a simple and low-cost manner.

3 Claims, 3 Drawing Sheets

(56) References Cited

U.S. PATENT DOCUMENTS

| | | | |
|---|---|---|---|
| 2008/0205655 A1* | 8/2008 | Wilkins et al. | 380/279 |
| 2009/0290707 A1* | 11/2009 | Schneider | 380/45 |
| 2010/0121936 A1* | 5/2010 | Liu et al. | 709/217 |
| 2010/0142710 A1* | 6/2010 | Chrysler et al. | 380/277 |
| 2010/0199129 A1* | 8/2010 | Kitani | 714/25 |
| 2010/0303232 A1* | 12/2010 | Connolly et al. | 380/247 |
| 2011/0142239 A1* | 6/2011 | Suh et al. | 380/270 |

OTHER PUBLICATIONS

International Search Report dated Dec. 13, 2010; PCT/EP2010/058568; International Filing Date: Jun. 17, 2010; Gigaset Communications GmbH; 3 pages.

Ting Yuan et al: "A Matrix-Based Random Key Pre-distribution Scheme for Wireless Sensor Networks"; Oct. 16, 2007, Computer and Information Technology, 2007, 6 pages.

"Digital Enhanced Cordless Telecommunications (DECT); Common Interface (CI); Part 7: Security Features; ETSI EN 300 175-7", ETSI Standard, European Telecommunications Standards Institute (ETSI), Sophia Antipolis Cedex, France, vol. DECT, No. VS.2.1, Nov. 1, 2008, 90 pages.

Written Opinion; PCT/EP2010/058568; International Filing Date: Jun. 17, 2010; Gigaset Communications GmbH; 5 pages.

International Preliminary Report on Patentability; PCT/EP2010/058568; International Filing Date: Jun. 17, 2010; Gigaset Communications GmbH; 6 pages.

* cited by examiner

ENCODING A CONNECTION BETWEEN A BASE AND A MOBILE PART

FIELD OF TECHNOLOGY

The invention relates to a method for encoding a connection between a base and a mobile handset, wherein a key is generated which is agreed to between the base and the mobile handset during a first connection. The invention further relates to a computer program product comprising a coding means which is adapted to perform the steps of the method according to the present invention when run on a computer.

BACKGROUND

In the actual public discussions concerning the security of Digital Enhanced Cordless Telecommunications products, hereinafter referred to as DECT products, a point often criticised is that even in basically encoded connections dialing information yet often is transmitted uncoded before the encoding process actually is activated. DECT is a standard for cordless telephones as well as for cordless data transmission in general. DECT is defined in the ETSI standard EN 300 175, wherein ETSI stands for European Telecommunications Standards Institute. CAT-iq, short for Cordless Advanced Technology —Internet and Quality, is envisaged as a novel standard for DECT. DECT is a successor to the standards CT1+ and CT2 the operating license of which in Germany has expired on 31 Dec. 2008. DECT presently is subjected to an operating license until at least 2020.

The reason for the deficiency often criticised that, for example, during the establishment of a DECT connection dialing information is encoded only after the elapse of a few seconds is that the initiation of the encoding process initially requires the generation of a common key, a so-called derived cipher key, within the base and the mobile handset. This occurs within the frame of the network procedure "authentication of PT", wherein PT stands for portable terminal. Following this in the conventional "cipher switching initiated by FT", wherein FT stands for fixed terminal, the base requests the activation of the encoding process from the mobile handset on the network layer. The procedure "cipher switching initiated by FT" is indispensable for the Generic Access Protocol abbreviated as GAP at the mobile handset. According to this the mobile handset actually activates the encoding process on the Media Access Control layer abbreviated as MAC layer. These processes run parallel to the Call Control messages, hereinafter referred to as CC messages, which serve for the establishment of the actual call. Until the encoding process is actually activated on the air interface dialing information has typically already been transmitted. This results in the so-called security gap in DECT products. Normally in modern devices this problem has not been taken into consideration, i.e. it occurs occasionally and is partially dependent on the external circumstances such as user interactions, the point of time when the dialing or the CLIP information short for Calling Line Identification Presentation information is transmitted and if at that point of time the encoding process is already activated or not. Typically this is not the case.

Blocking the connection establishment until the encoding process is activated leads to the disadvantages that this delay is directly at the cost of the performance at the user interface; the solution is prone to errors and a complex buffering of messages becomes necessary accompanied by the simultaneous danger of buffer overflows; the solution seems realisable only for CC messages or for mobile management or for Call Independent Supplementary Service status messages, abbreviated as CISS status messages, is only separately and very difficult realisable; and the solution seems hardly to be standardizable.

It is also extremely problematic to generate an instant encoding during a connection establishment between a base and a mobile handset.

SUMMARY

This invention provides capability to initiate an encoding process of a connection between a base and a mobile handset even prior to or simultaneously with the first data set to be transmitted.

The capability to initiate a coding process is achieved by providing a method for encoding a connection between a base and a mobile handset, wherein the method comprises the following steps: a) generating a key agreed to between the base and the mobile handset during a first connection, wherein the key comprises an index assigned to by the base during the first connection, and b) using the generated key in a second connection between the base and the mobile handset, wherein the data to be transmitted between the base and the mobile handset are identified and encoded using the index assigned to the key.

Thus an instant encoding of a connection between a base and a mobile handset is ensured and the security during cordless data transmission is increased. Preferably the data to be transmitted between the base and the mobile handset are identified based on the indexes assigned to the key and encoded immediately after the MAC connection establishment.

The key preferably comprises a default cipher key and/or a derived cipher key. The generation of the key preferably is implemented after a first registration between the base and the mobile handset and is permanently stored within a memory. The key preferably initially is defined and stored within a permanent memory such as a non-volatile memory.

According to a preferred exemplary embodiment of the invention the key is determined at an arbitrary point of time during the connection establishment between the base and the mobile handset.

According to another preferred exemplary embodiment of the invention a new key is agreed to during the second connection by means of which the further connection between the base and the mobile handset is re-encoded. This leads to a further increase in the security for cordless data transmission.

According to another aspect of the invention the object is achieved by providing a computer program product comprising a coding means which is adapted to implement the steps of the method according to the invention when run on a computer.

The method according to the invention serves for instantly encoding a connection between a base and a mobile handset. In other words, the carrier medium is encoded during a cordless data transmission between the base and the mobile handset. Preferably the method is implemented by a procedure and can be implemented and standardized as a procedure. To this end in the procedure a key is agreed to and stored within a preceding connection and subsequently in a second connection the key is directly transmitted at the beginning by means of an encoded burst, for example in the air. This new key will be used in later connections. Thus the key is used in common for triggering the base and the mobile handset.

BRIEF DESCRIPTION

In the following the invention is explained in further detail based on preferred exemplary embodiments with reference to the drawings FIG. 1 shows a flow chart of a method according to first preferred exemplary embodiment of the invention including two connections;

DETAILED DESCRIPTION

Figure 1:
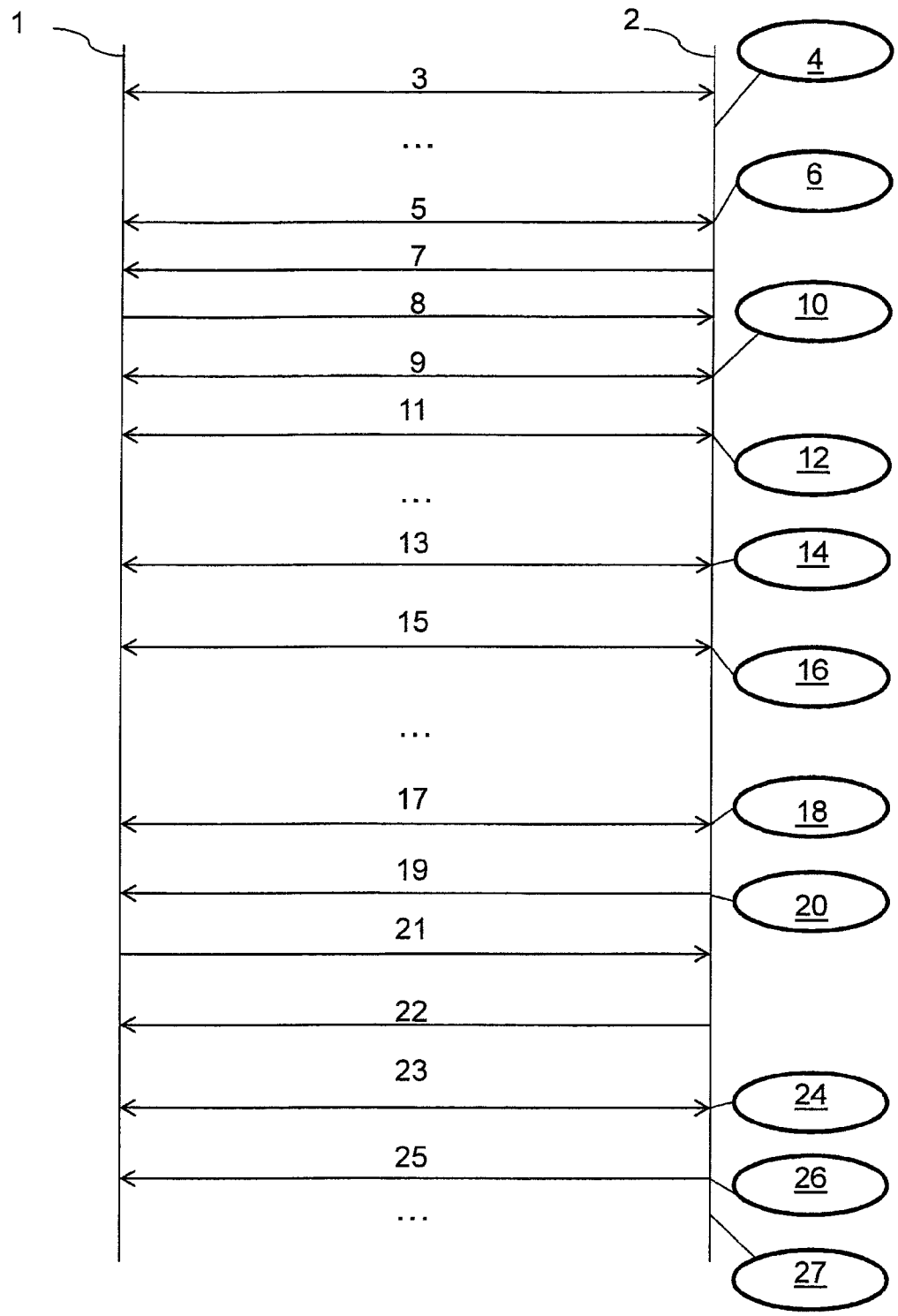

FIG. 1 shows a flow chart of a method according to a first preferred exemplary embodiment of the invention including two connections. With reference to FIG. 1 it is obvious that a first connection between a mobile handset 1 and a base 2 is initiated which initially is performed uncoded (reference symbols 4, 6, 10, and 12). The registration procedure 3 is implemented between the mobile handset 1 and base 2. Herein neither a default cipher key nor a derived cipher key is generated, (reference symbol 4 in FIG.1). After further steps a MAC connection establishment 5 is effected, which is an uncoded connection establishment 6. Subsequently CC messages are output such as CC setup 7 and CC alerting 8. Then an authentication of PT procedure 9 takes place, wherein a derived cipher key is generated 10. This generated derived cipher key is agreed to as an actual key 11 and is denoted as default cipher key. Thus the default cipher key is agreed to 12 from the end of the first connection.

After further steps a MAC connection establishment 13 follows during a second connection between the base 2 and the mobile handset 1. The second connection is denoted in FIG. 1 by the reference symbols 14, 16, 18, 20, 24, 26 and 27. The MAC instantly initiates the encoding using the default cipher key 14 which has been agreed to after the end of the first connection 12. Subsequently an arbitrary mobile management procedure 15 is implemented, such as a local registration, and the transmission is done using the default cipher key 16. Thus an instant encoding of the data to be transmitted takes place. After further steps a further MAC connection establishment 17 is implemented, wherein the MAC instantly initiates the encoding using the default cipher key 18. Subsequently further CC messages are output, such as CC setup 19, wherein the transmission is encoded with the default cipher key 20, CC alerting 21 and CC info with CLIP 22. Then a "authentication of PT" procedure is implemented 23, wherein the derived cipher key is generated 24. Finally the base 2 transmits a cipher suggest 25 to the mobile handset 1 which requests the encoding with the derived cipher key 26. Thus the next connection is encoded with the derived cipher key 27.

FIG. 1 also shows the process of an incoming call in which the CLIP information is transmitted prior to the initiation of the encoding process with the derived cipher key. Typically the transmission of the CLIP information will often overlap with the messages for generating the derived cipher key. The case of an outgoing call in which instead of the CLIP information the dialed numbers can be intercepted is implemented analogously.

Thus a default cipher key is generated which as such is agreed to between the mobile handset 1 and the base 2. Subsequently using the default cipher key each further connection on the MAC layer is encoded immediately after the MAC connection establishment as long as the validity of the registration data is maintained. Thus, for the establishment of a MAC connection an exchange of network messages prior to the initiation of the encoding process is no longer necessary, i.e. neither CC messages nor cipher initiating messages are necessary. Thus the connection is encoded even for the first transmitted network message such as CC setup and also for all subsequent network messages, such as CC related messages including dialing information.

The default cipher key can be determined in different ways: The first way is to define the default cipher key as the derived cipher key generated subsequent to the registration with the first "authentication of PT" and to store the default cipher key after the generation permanently in a nonvolatile memory, such as an EEPROM, short for Electrically Erasable Programmable Read-Only Memory. According to a second way the default cipher key is tuned at an arbitrary point of time even multiple times during the validity of a registration in the frame of a standardized or proprietary procedure as the actual valid derived cipher key. According to the first preferred exemplary embodiment of the invention the second alternative is used which provides more flexibility.

The exchange of the default cipher key between the base 2 and the mobile handset 1 serves for supporting the connection. The exchange is implemented either using proprietary or standardized protocol elements. In the course of a connection a derived cipher key can be generated using common mechanisms known for DECT products. Once the new key is determined the encoding process can be switched thereto and the remainder of the connection can be encoded with the new key. Thus the default cipher key is active only for a short period of time such as at the beginning of a CC connection and for mobility management procedures or for CISS transmissions.

Figures 2, 3:
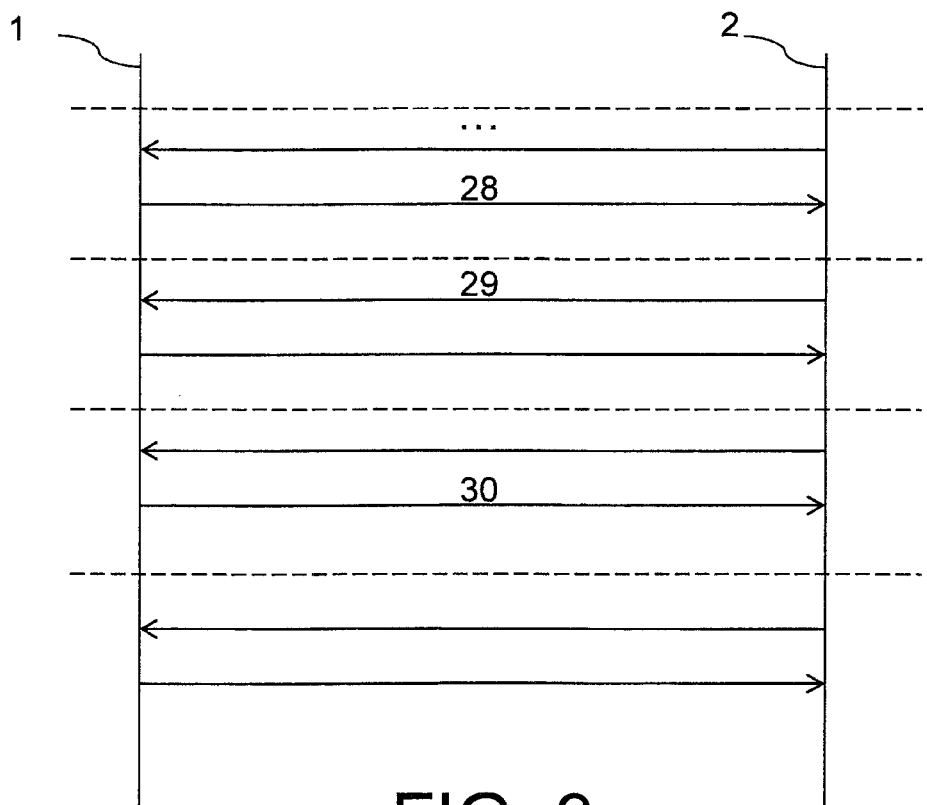
FIG. 2 shows an extension of MAC Encryption Control messages in a method according to a second exemplary embodiment of the invention.
FIG. 3 shows a MAC encoding procedure with cipher key index in a method according to a third exemplary embodiment of the invention including one connection.

FIG. 2 shows an extension of the MAC encryption control messages in a method according to a second preferred exemplary embodiment of the invention. FIG. 2 includes different tables, wherein normally the key is stored in a 64 bit representation. The upper part in FIG. 2 relates to an instruction in the representation 10×× ("only for command=10××"). The central part in FIG. 2 shows the individual commands and the meaning of the message. Finally the lower part in FIG. 2 includes the representation of the index for the key also called cipher key index and the corresponding meaning. Thus, preferably a system wide unique cipher key index, short CKID, is defined which is assigned from the base 2 while a default cipher key is agreed to. This CKID is then transmitted as well within the MAC encryption procedure during subsequent DECT connections at the activation of the default cipher key direct after the connection establishment. In this way an unambiguous assignment of the default cipher key can be realised within the base 2.

FIG. 3 shows the MAC encoding procedure with cipher key index according to a third preferred exemplary embodiment of the invention. This corresponds to the MAC encryption procedure EN 300 175-7 with the difference that additionally the CKID is transmitted. This exemplary embodiment shows the process at the beginning of the second connection (see FIG. 1) of the method according to the present invention. In the course of this connection between the mobile handset 1 and the base 2 an inquiry for starting the encryption process with the new index is made from the mobile handset 1 to the base 2 which is denoted as encryption start request (cipher key ID=0×ABCD) 28 Immediately thereafter the encryption start is confirmed from the base 2 to the mobile handset 1 by means of an acknowledgement message, i.e. a so-called encryption start confirm (cipher key ID=0×ABCD) 29 is implemented. After a certain time this new key with the new index is granted to the base 2 from the mobile handset 1, i.e. a so-called encryption start grant (cipher key ID=0×ABCD) 30 is transmitted. As indicated above this corresponds to the process of the second connection between the base 2 and the mobile handset 1.

Thus the encoding is activated immediately subsequent to the MAC connection establishment, i.e. prior to any higher layer signalling. To this end in a first communication between the base and the mobile handset, i.e. a previous communication, a cipher key for this immediate activation of the encoding process is agreed to. For an instant activation of the encoding process subsequent to the MAC connection establishment a MAC communication is used by which the cipher key agreed to in a previous communication can be identified and used for the new encoding process.

According to a further preferred exemplary embodiment of the invention on the immediately encoded connection a new cipher key is agreed to with a corresponding higher layer signalling and then the encoding process is switched to this newly generated cipher key. In this way the security is further increased.

By the introduction of the default cipher key and the application in combination with the derived cipher key as described above a direct improvement in terms of the relevant scenarios actually discussed in view of security aspects is achieved. Additionally to the direct advantage of the encoding of dialing information the dynamic change between both cipher keys on an already encoded connection will hamper the hacking of the cipher key by potential hackers. Preferably the combination of the default cipher key and the derived cipher key is used, however, a sole utilization of the default cipher key is possible, too. Preferably the key is altered multiple times over of time such that the target for hacking becomes even smaller.

The method according to the present invention is also applicable in the novel DECT standard the so-called CAT-iq standard. Particularly for definitions of the default cipher key as the first cipher key generated subsequent to the registration an application between devices of different manufacturers can be realised. A definition as obligatory feature in CAT-iq can be realised, too.

It should be noted that, as described above, the mechanism of the "default cipher key" can be combined with the encoding mechanisms defined in DECT. Dependent on capability bits defined in DECT the encoding process can be implemented without or with the default cipher key until the derived cipher key is generated. Thus the method according to the present invention is also downward compatible with prior manufacturer's products.

Figure 4:
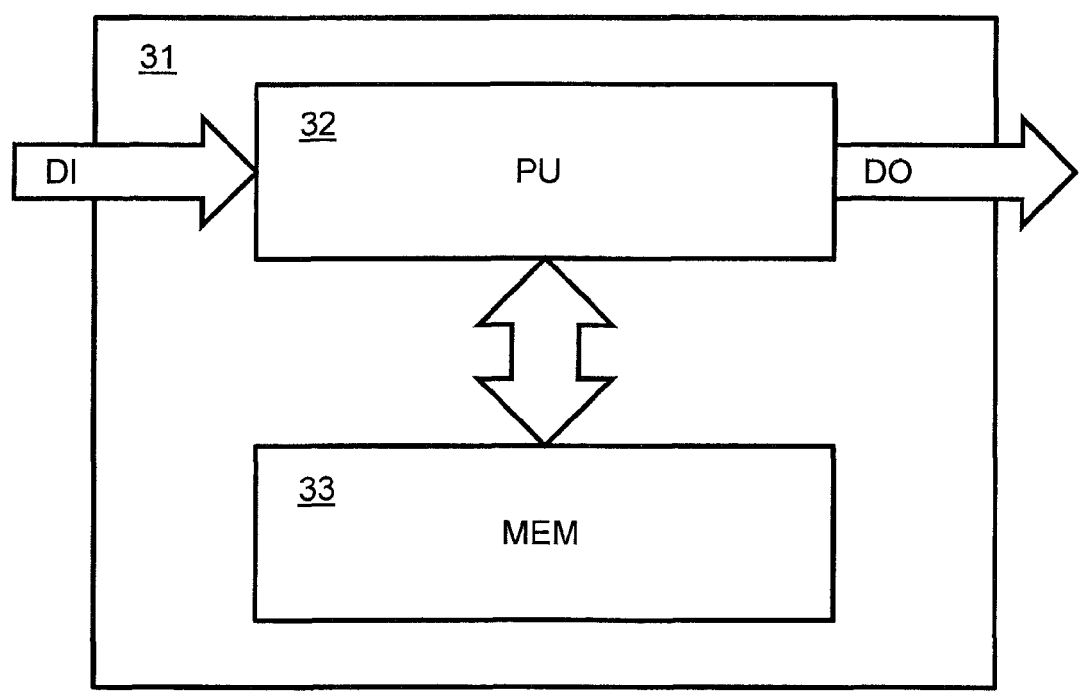
FIG. 4 shows a software-based implementation according to a fourth exemplary embodiment of the invention.

FIG. 4 shows a schematic block diagram of a software-based implementation according to a fourth preferred exemplary embodiment of the invention. According to this fourth preferred exemplary embodiment of the invention the unit 31 provided comprises a processing unit (PU) 32 which is provided on a single chip or on a chip module. The processing unit 32 comprises any processor unit or any computer unit including a control unit which implements a control by means of software routines of a control program, wherein the software routines are stored in a memory unit 33 also called memory (MEM). Program code instructions are read out from the MEM 33 and loaded into the control unit of the PU 32 in order to implement the individual process steps of the method according to the present invention. The process steps of the blocks 31 and 32 can be implemented on the basis of input data (data input (DI)) and can generate output data (data output (DO)), wherein the input data DI correspond to data or signals which have been communicated and/or detected, and the output data DO can correspond to data or signals that are or are to be communicated to other units.

The invention claimed is:

1. A method for encoding a connection between a base and a mobile handset, comprising the steps of:
   a) generating a key agreed to between the base and the mobile handset during a first connection, wherein the key comprises an index assigned to the key by the base during the first connection; and
   b) using the key for a second connection between the base and the mobile handset, wherein a data to be transmitted between the base and the mobile handset are identified and encoded using the index assigned to the key,
   wherein the generation of the key is implemented after a first registration between the base and the mobile handset, and the key is permanently stored in a memory as a default cipher key,
   wherein during the second connection a new key as a derived cipher key is agreed to with which a further connection between the base and the mobile handset is re-encoded.

2. The method according to claim 1, wherein the key is determined as an actual key at an arbitrary point of time during a connection establishment between the base and the mobile handset.

3. A computer program product comprising:
   a computer-readable hardware storage device having computer-readable program code stored therein, said program code configured to be executed by a processor of a computer system to implement a method for encoding a connection between a base and a mobile handset, comprising the steps of:
   a) generating a key agreed to between the base and the mobile handset during a first connection, wherein the key comprises an index assigned to the key by the base during the first connection; and
   b) using the key for a second connection between the base and the mobile handset, wherein a data to be transmitted between the base and the mobile handset are identified and encoded using the index assigned to the key, wherein the generation of the key is implemented after a first registration between the base and the mobile handset, and the key is permanently stored in a memory as a default cipher key, wherein during the second connection a new key as a derived cipher key is agreed to with which a further connection between the base and the mobile handset is re-encoded.

* * * * *